United States Patent
Matsubayashi

(10) Patent No.: US 10,179,868 B2
(45) Date of Patent: Jan. 15, 2019

(54) ADDITION-CURABLE ANTISTATIC ORGANOPOLYSILOXANE COMPOSITION AND ANTISTATIC SILICONE FILM

(71) Applicant: Shin-Etsu Polymer Co., Ltd., Tokyo (JP)

(72) Inventor: Sou Matsubayashi, Saitama (JP)

(73) Assignee: SHIN-ETSU POLYMER CO., LTD., Tokyo (JP)

( * ) Notice: Subject to any disclaimer, the term of this patent is extended or adjusted under 35 U.S.C. 154(b) by 0 days.

(21) Appl. No.: 15/527,943

(22) PCT Filed: Dec. 2, 2015

(86) PCT No.: PCT/JP2015/083874
§ 371 (c)(1),
(2) Date: May 18, 2017

(87) PCT Pub. No.: WO2016/093124
PCT Pub. Date: Jun. 16, 2016

(65) Prior Publication Data
US 2018/0244952 A1  Aug. 30, 2018

(30) Foreign Application Priority Data

Dec. 9, 2014 (JP) ................. 2014-249050

(51) Int. Cl.
| | |
|---|---|
| *H01B 1/20* | (2006.01) |
| *C09D 183/04* | (2006.01) |
| *C09K 3/16* | (2006.01) |
| *C08K 5/1515* | (2006.01) |
| *C08L 49/00* | (2006.01) |
| *C08L 65/00* | (2006.01) |
| *C08L 79/00* | (2006.01) |
| *C08L 101/02* | (2006.01) |
| *C08L 83/04* | (2006.01) |
| *C09D 5/24* | (2006.01) |
| *C09D 165/00* | (2006.01) |
| *C08G 77/12* | (2006.01) |
| *C08G 77/20* | (2006.01) |

(52) U.S. Cl.
CPC .......... *C09D 183/04* (2013.01); *C08K 5/1515* (2013.01); *C08L 49/00* (2013.01); *C08L 65/00* (2013.01); *C08L 79/00* (2013.01); *C08L 83/04* (2013.01); *C08L 101/02* (2013.01); *C09D 5/24* (2013.01); *C09D 165/00* (2013.01); *C09K 3/16* (2013.01); *C08G 77/12* (2013.01); *C08G 77/20* (2013.01)

(58) Field of Classification Search
CPC ............ H01B 1/12; H01B 1/124; H01B 1/20
See application file for complete search history.

(56) References Cited

U.S. PATENT DOCUMENTS

2006/0062958 A1* 3/2006 Yoshida ............... C08G 61/124
428/64.4

FOREIGN PATENT DOCUMENTS

| JP | 01-221457 A | 9/1989 |
|---|---|---|
| JP | 07-090060 A | 4/1995 |
| JP | 07-165892 A | 6/1995 |
| JP | 2002-241613 A | 8/2002 |
| JP | 2003-251756 A | 9/2003 |
| JP | 2006-249303 A | 9/2006 |
| JP | 2006-265297 A | 10/2006 |
| JP | 2007-128289 A | 5/2007 |
| JP | 2007-254730 A | 10/2007 |
| JP | 2008-045061 A | 2/2008 |
| JP | 2008-045116 A | 2/2008 |
| JP | 2011-032382 | 2/2011 |
| JP | 2014-189597 A | 10/2014 |
| WO | 2005/052058 A1 | 6/2005 |
| WO | 2014/125826 A1 | 8/2014 |

OTHER PUBLICATIONS

Machine translation of JP 2002-241613.*
Machine translation of WO 2014/125826.*
The above Foreign references 1-5 were cited in the International Search Report of PCT/JP2015/083874 dated Mar. 8, 2016.

* cited by examiner

*Primary Examiner* — Haidung D Nguyen
(74) *Attorney, Agent, or Firm* — Cowan, Liebowitz & Latman, P.C.; Mark Montague

(57) ABSTRACT

[Problem] To form, by using a conductive composition capable of being stably dispersed and solubilized in a solvent consisting mainly of an organic solvent, a silicone film having excellent conductivity and having few problems originating from amine compounds, such as problems wherein an addition-type silicone does not set easily.
[Solution] The present invention relates to: an addition-curable antistatic organopolysiloxane composition that includes (a) a π-conjugated conductive polymer, (b) a polyanion, (c) a compound represented by chemical formula (1), and (d) an addition-curable organopolysiloxane composition; and an antistatic silicone film formed by supplying the addition-curable antistatic organopolysiloxane composition onto a substrate and curing.

[Formula 1]

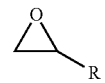

(1)

(R represents a functional group having an unsaturated bond).

10 Claims, No Drawings

ADDITION-CURABLE ANTISTATIC ORGANOPOLYSILOXANE COMPOSITION AND ANTISTATIC SILICONE FILM

CROSS-REFERENCE

This is a U.S. national stage of application No. PCT/JP2015/083874, filed on Dec. 2, 2015, which claims priority based on Japanese Patent Application No. 2014-249050, filed in Japan on Dec. 9, 2014, the content of which is incorporated herein by reference. Further, the contents described in patents, patent applications and literatures quoted in the present application are incorporated herein by reference.

TECHNICAL FIELD

The present invention relates to an addition-curable antistatic organopolysiloxane composition, and an antistatic silicone film made by supplying and curing the composition on a substrate.

BACKGROUND ART

Generally, π-conjugated conductive polymers whose main chains are constituted of a conjugated group containing π electrons are synthesized by an electrolytic polymerization method or a chemical oxidative polymerization method. In the electrolytic polymerization method, a mixed solution of an electrolyte to become a dopant and a precursor monomer to form a π-conjugated conductive polymer is prepared; electrodes are disposed in the solution and a supporter such as an electrode material formed in advance is immersed therein; and by applying a voltage between the electrodes, the π-conjugated conductive polymer is formed in a film shape on the supporter surface. Thus, the electrolytic polymerization method, since needing an apparatus for electrolytic polymerization, and being carried out in batch production, is inferior in mass productivity. By contrast, the chemical oxidative polymerization method has no such restriction, and can produce a large amount of a π-conjugated conductive polymer in a solution by adding an oxidizing agent and an oxidative polymerization catalyst to a precursor monomer to form the π-conjugated conductive polymer.

In the chemical oxidative polymerization method, however, the π-conjugated conductive polymer, since becoming poor in solubility in a solvent along with the growth of the conjugated group of the main chain constituting the π-conjugated conductive polymer, is obtained as a solid powder insoluble in the solvent. Hence, it is difficult to form a film having a uniform thickness of the π-conjugated conductive polymer on various types of base materials such as plastics by means such as coating. For such a reason, a method of introducing a functional group to a π-conjugated conductive polymer to make the π-conjugated conductive polymer soluble in a solvent, a method of dispersing a π-conjugated conductive polymer in a binder resin to solubilize the π-conjugated conductive polymer in a solvent, a method of adding an anionic group-containing polymer acid to a π-conjugated conductive polymer to solubilize the π-conjugated conductive polymer in a solvent, and the like have been attempted. For example, a method is known in which in order to improve the solubility of a π-conjugated conductive polymer to water, a poly(3,4-dialkoxythiophene) aqueous solution is produced by chemically oxidatively polymerizing 3,4-dialkoxythiophene in the presence of a polystyrene-sulfonic acid as an anionic group-containing polymer acid having a molecular weight of 2,000 to 500,000 by using an oxidizing agent (for example, see Patent Literature 1). Further, a method is also known in which a π-conjugated conductive polymer colloid aqueous solution is produced by chemically oxidatively polymerizing a precursor monomer to form a π-conjugated conductive polymer in the presence of a polyacrylic acid (for example, see Patent Literature 2).

Further methods are also proposed in which a conductive solution miscible with an organic resin is produced by dissolving or dispersing a conductive composition in an organic solvent. As an example thereof, a solution of polyaniline in an organic solvent and its production method are known (for example, see Patent Literature 3). Further, solvent substitution methods by phase transfer from an aqueous solution containing a polyanion and an intrinsically conductive polymer to an organic solvent are also known (for example, see Patent Literatures 4, 5, 6 and 7). Further, a method is known in which an intrinsically conductive polymer after freeze-drying is dissolved in an organic solvent (for example, see Patent Literature 8). These methods, however, have such problems that as seen in the example of the polyaniline, the mixing with other organic resins is difficult and besides, the solvent group is limited to a solvent group containing a large amount of water. Even when only a small amount of water or substantially no water is contained, as seen in the above literatures (for example, see Patent Literatures 4, 5, 6 and 7), the methods have such problems that the use of an amine compound when being mixed with a resin causes the deterioration of the color tone with time, and the doping of a polyanion on a conductive polymer is gradually withdrawn by the amine and the conductivity decreases with time. Further, when a conductive polymer is mixed with an addition reaction-curable silicone resin, the method has such a drawback that an amine causes the curing inhibition and the curing of the silicone resin is insufficient.

In silicone industries, a demand is conventionally present for imparting an antistatic function to highly insulating silicone compositions in release applications and applications to pressure-sensitive adhesives. In order to meet the demand, methods have been attempted conventionally in which a carbon powder, a metal powder and an ionic conductive substance are added to silicone compositions. It is the present situation, however, that these methods do not come to satisfy many functions of the silicone resins, such as the transparency, the release performance, the tackiness performance, and the dependency of the conductivity on humidity resistance. Here, although a technology is known in which a conductive polymer in an emulsion form is mixed in a silicone resin emulsion (for example, see Patent Literatures 9 and 10), the product of the technology, since being a water dispersion, has a limit to practicability and has drawbacks such as the corrosion of devices by water and the lack of the adhesiveness.

CITATION LIST

Patent Literature

Patent Literature 1: Japanese Patent Laid-Open No. 7-090060
Patent Literature 2: Japanese Patent Laid-Open No. 7-165892
Patent Literature 3: International Publication No. WO2005/052058
Patent Literature 4: Japanese Patent Laid-Open No. 2006-249303

Patent Literature 5: Japanese Patent Laid-Open No. 2007-254730

Patent Literature 6: Japanese Patent Laid-Open No. 2008-045061

Patent Literature 7: Japanese Patent Laid-Open No. 2008-045116

Patent Literature 8: Japanese Patent Laid-Open No. 2011-032382

Patent Literature 9: Japanese Patent Laid-Open No. 2002-241613

Patent Literature 10: Japanese Patent Laid-Open No. 2003-251756

SUMMARY OF INVENTION

Technical Problem

The above-mentioned conventional conductive solutions, when using an amine-based compound, conductive polymers are phase-transferred from a water phase to an organic phase, cannot overcome the above drawbacks originated from the amine-based compounds. Further, the form of a water dispersion has drawbacks being low in practicability and being liable to cause corrosion by water. There are such strong demands that while such drawbacks are overcome, the impartation of an antistatic function to silicone films, the reduction of silicone curing inhibition, and further the improvement of adhesiveness onto substrates are achieved.

The present invention has an object to provide: an addition-curable antistatic organopolysiloxane composition capable of reducing the problems originated from the amine-based compounds and the problems originated from water, capable of imparting an antistatic function to a silicone film and reducing the silicone curing inhibition, and excellent in the adhesiveness; and an antistatic silicone film made by curing the composition.

Solution to Problem

In order to achieve the above object, the present inventors have developed an entirely novel technology using no amine-based compound and using a vinyl group-containing epoxy compound, and this finding has led to the completion of the present invention. The specific solution to the problem is as follows.

An addition-curable antistatic organopolysiloxane composition according to one embodiment to achieve the above object comprises (a) a π-conjugated conductive polymer, (b) a polyanion, (c) a compound represented by the following chemical formula (1), and (d) an addition-curable organopolysiloxane composition.

[Formula 1]

(1)

wherein R denotes a functional group having an unsaturated bond.

In an addition-curable antistatic organopolysiloxane composition according to another embodiment, (c) the compound represented by the chemical formula (1) is made to be a compound represented by the following chemical formula (2).

[Formula 2]

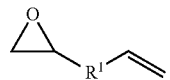

(2)

wherein $R^1$ denotes any functional group that is not particularly limited.

An addition-curable antistatic organopolysiloxane composition according to another embodiment comprises a reaction product of (b) the polyanion with (c) the compound represented by the chemical formula (1).

In an addition-curable antistatic organopolysiloxane composition according to another embodiment, (a) the π-conjugated conductive polymer has one or more repeating units selected from the group consisting of polypyrroles, polythiophenes, polyacetylenes, polyphenylenes, polyphenylene vinylenes, polyanilines, polyacenes, polythiophene vinylenes and copolymers of two or more thereof.

In an addition-curable antistatic organopolysiloxane composition according to another embodiment, (a) the π-conjugated conductive polymer is made to be a poly(3,4-ethylenedioxythiophene) or a polypyrrole.

In an addition-curable antistatic organopolysiloxane composition according to another embodiment, (b) the polyanion comprises one or more anionic groups selected from a sulfonic acid group, a phosphoric acid group and a carboxy group.

In an addition-curable antistatic organopolysiloxane composition according to another embodiment, (b) the polyanion comprises, as copolymerization constituents, a polystyrenesulfonic acid, a polyvinylsulfonic acid, a polyacrylic alkylenesulfonic acid, a poly(2-acrylamide-2-methyl-1-propanesulfonic acid), or one or more thereof.

An addition-curable antistatic organopolysiloxane composition according to another embodiment further comprises an organic solvent.

An antistatic silicone film according to one embodiment is made by supplying and curing any one of the above addition-curable antistatic organopolysiloxane compositions on a substrate.

Advantageous Effects of Invention

The present invention can provide an addition-curable antistatic organopolysiloxane composition capable of reducing the problems originated from the amine-based compounds and the problems originated from water, capable of imparting an antistatic function to a silicone film and reducing the silicone curing inhibition, and excellent in the adhesiveness; and an antistatic silicone film made by curing the composition.

DESCRIPTION OF EMBODIMENTS

Hereinafter, each embodiment of the addition-curable antistatic organopolysiloxane composition and the antistatic silicone film according to the present invention will be described.

<A. An Embodiment of an Addition-Curable Antistatic Organopolysiloxane Composition>

1. An Addition-Curable Antistatic Organopolysiloxane Composition

The addition-curable antistatic organopolysiloxane composition according to the embodiment of the present invention comprises (a) a π-conjugated conductive polymer, (b) a polyanion, (c) a compound represented by the following chemical formula (1), and (d) an addition-curable organopolysiloxane composition. In the present application, (c) the compound represented by the following chemical formula (1) may be simply dissolved or dispersed in the addition-curable antistatic organopolysiloxane composition according to the embodiment, or may form a reaction product by reacting with (b) the polyanion. The addition-curable antistatic organopolysiloxane composition according to the embodiment may be dissolved or dispersed in a solvent mainly containing water, or may be dissolved or dispersed in a solvent mainly containing an organic solvent.

[Formula 3]

(1)

wherein R denotes a functional group having an unsaturated bond.

Further, in the addition-curable antistatic organopolysiloxane composition according to the embodiment, (c) the compound represented by the chemical formula (1) may be made to be a compound represented by the following chemical formula (2).

[Formula 4]

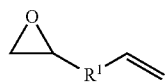

(2)

wherein $R^1$ denotes any functional group that is not particularly limited.

By doping the π-conjugated conductive polymer with the polyanion, a complex of the π-conjugated conductive polymer and the polyanion is formed. In the polyanion, not all anionic groups are doped on the π-conjugated conductive polymer, and the polyanion has surplus anionic groups. The surplus anionic groups, since being hydrophilic, play a role of solubilizing the complex in water. In order to solubilize the complex in an organic solvent, by exerting some action on anionic groups as hydrophilic groups, the hydrophilicity needs to be reduced. The above compound represented by the chemical formula (1) contributes to reducing the hydrophilicity.

A conductive polymer having the polyanion to be used in the present application as a dopant is formed of microparticles having a particle diameter of about several tens of nanometers. Such microparticles are transparent in the visible light region due to the presence of the polyanion having an effect as a surfactant, and look like microparticles being dissolved in a solvent. Actually, the microparticles are dispersed in the solvent; in the present application, however, this state is referred to as a "dispersed and solubilized" state. The solvent is a solvent mainly containing an organic solvent. Here, "mainly containing an organic solvent" means that the organic solvent accounts for more than 50% in the solvent. It is especially preferable that the solvent is in the range of the organic solvent:water=90:10 to 100:0 in weight ratio.

1.1 Production Methods

The addition-curable antistatic organopolysiloxane composition according to the embodiment can be obtained by a production method comprising a step of adding the compound represented by the chemical formula (1) and the addition-curable organopolysiloxane composition to a water dispersion of a complex of the π-conjugated conductive polymer and the polyanion doped thereon, and removing at least moisture. Further, the addition-curable antistatic organopolysiloxane composition according to the embodiment can be obtained also by a production method comprising a step of adding the compound represented by the chemical formula (1) and the addition-curable organopolysiloxane composition to a water dispersion of a complex of the π-conjugated conductive polymer and the polyanion doped thereon, phase-transferring the resultant to an organic solvent insoluble in water, and removing at least moisture. Alternatively, the addition-curable antistatic organopolysiloxane composition according to the embodiment can be obtained also by a production method comprising a step of adding the compound represented by the chemical formula (1) and the addition-curable organopolysiloxane composition to a dried solid of a complex of the π-conjugated conductive polymer in advance reduced in moisture and the polyanion doped thereon.

The addition-curable antistatic organopolysiloxane composition according to the embodiment can be produced, in more detail, by the following method, as one example.

(1) A Production Method from a Water Dispersion in which a Conductive Polymer and Polyanion Complex is Dispersed A water dispersion in which a conductive polymer and polyanion complex is dispersed can be obtained by carrying out polymerization in the state of an aqueous solution or a water dispersion in which a monomer for the conductive polymer and the dopant coexist, in the presence of an oxidizing agent. Here, a water dispersion may be prepared not only by such polymerization of a monomer but also by using commercially available water dispersions of conductive polymer and dopant complexes. Examples of the commercially available water dispersions of conductive polymer and dopant complexes include a water dispersion (trade name: Clevios) of a PEDOT-PSS complex, manufactured by Heraeus Clevios GmbH, and a water dispersion (trade name: Orgacon) of a PEDOT-PSS complex, manufactured by Agfa Gevaert AG.

The addition-curable antistatic organopolysiloxane composition is obtained by adding the compound (hereinafter, suitably referred to as "epoxy group-containing unsaturated compound") represented by the chemical formula (1) and the addition-curable organopolysiloxane composition together with a solvent to the above water dispersion, thereafter, preferably reacting the anion with the group of the epoxy group-containing unsaturated compound, and thereafter, concentrating, filtering-out or drying-up the solution. Thereafter, suitably, the obtained concentrate or solid is dissolved or dispersed in a solvent mainly containing an organic solvent, and used in a form of a coating material. Alternatively, the epoxy group-containing unsaturated compound and the addition-curable organopolysiloxane composition together with a solvent are added to the water dispersion; thereafter, preferably during the anion is reacted with the group of the epoxy group-containing unsaturated compound, or after the reaction, an organic solvent insoluble in water is added and the addition-curable antistatic organopolysiloxane composition is phase-transferred to the solvent phase (referred to also as organic phase) insoluble in water; the resultant is subjected, as required, to steps including dehydration; and thereafter, the addition-curable antistatic organopolysiloxane composition may be dissolved or dispersed in a solvent (for example, solvent in the range of an organic solvent:water=90:10 to 100:0 in weight ratio) mainly containing the organic solvent. Here, the anion and the epoxy group-containing unsaturated compound may not necessarily be reacted.

(2) Production Methods from a Solid Substance of a Freeze-Dried Conductive Polymer and Polyanion Complex (2-a)

The addition-curable antistatic organopolysiloxane composition is obtained by charging and stirring a solid substance of a freeze-dried conductive polymer and polyanion complex in an aqueous solution containing the epoxy group-containing unsaturated compound and the addition-curable organopolysiloxane composition, filtering the resultant, thereafter washing the filtrand, and adding an organic solvent thereto.

(2-b)

The addition-curable antistatic organopolysiloxane composition is obtained by charging a solid substance of a freeze-dried conductive polymer and polyanion complex in an organic solvent, and further charging the epoxy group-containing unsaturated compound and the addition-curable organopolysiloxane composition therein.

1.2 Raw Materials for the Addition-Curable Antistatic Organopolysiloxane Composition (a) The π-Conjugated Conductive Polymer The π-conjugated conductive polymer can be used without any limitation as long as being an organic polymer whose main chain is constituted of the π-conjugated group. Examples thereof suitably include polypyrroles, polythiophenes, polyacetylenes, polyphenylenes, polyphenylene vinylenes, polyanilines, polyacenes, polythiophene vinylenes and copolymers of two or more thereof. From the viewpoint of the easiness of the polymerization and the stability in air, polypyrroles, polythiophenes and polyanilines can especially suitably be used. Although the π-conjugated conductive polymer, even as it is in the non-substituted state, exhibits a sufficiently high conductivity and compatibility with a binder, in order to more enhance the conductivity and the dispersibility or solubility to a binder, a functional group such as an alkyl group, an alkenyl group, a carboxy group, a sulfo group, an alkoxyl group, a hydroxyl group or a cyano group may be introduced.

Suitable examples of the π-conjugated conductive polymer include polypyrrole, poly(N-methylpyrrole), poly(3-methylpyrrole), poly(3-ethylpyrrole), poly(3-n-propylpyrrole), poly(3-butylpyrrole), poly(3-octylpyrrole), poly(3-decylpyrrole), poly(3-dodecylpyrrole), poly(3,4-dimethylpyrrole), poly(3,4-dibutylpyrrole), poly(3-carboxypyrrole), poly(3-methyl-4-carboxypyrrole), poly(3-methyl-4-carboxyethylpyrrole), poly(3-methyl-4-carboxybutylpyrrole), poly(3-hydroxypyrrole), poly(3-methoxypyrrole), poly(3-ethoxypyrrole), poly(3-butoxypyrrole), poly(3-hexyloxypyrrole), poly(3-methyl-4-hexyloxypyrrole), polythiophene, poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), poly(3-methyl-4-carboxybutylthiophene), polyaniline, poly(2-methylaniline), poly(3-isobutylaniline), poly(2-anilinesulfonic acid), and poly(3-anilinesulfonic acid).

In the above examples of the π-conjugated conductive polymer, in consideration of the resistance value and the reactivity, one or a copolymer composed of two or more selected from polypyrrole, polythiophene, poly(N-methylpyrrole), poly(3-methoxythiophene) and poly(3,4-ethylenedioxythiophene) can especially suitably be used. Further, in the aspect of the high conductivity and the high heat resistance, polypyrrole and poly(3,4-ethylenedioxythiophene) can more suitably be used. Further, alkyl-substituted compounds like poly(N-methylpyrrole) and poly(3-methylthiophene) can be used more suitably in order to improve the solubility in a solvent mainly containing an organic solvent, and the compatibility with and dispersibility in a hydrophobic resin if it is added. Among the alkyl groups, a methyl group is more preferable because less adversely affecting the conductivity.

(b) The Polyanion

The polyanion can be used without any limitation as long as being an anionic compound. The anionic compound refers to a compound having an anionic group in its molecule capable of causing the chemically oxidative doping to (a) the π-conjugated conductive polymer. The anionic group is, from the viewpoint of the easiness of the production and the high stability, preferably a phosphate group, a carboxy group, a sulfo group or the like. Among these anionic groups, for the reason of being excellent in the doping effect to (a) the π-conjugated conductive polymer, a sulfo group or a carboxy group is more preferable.

Examples of the polyanion include polymers made by sulfonating polymers having no anionic groups by a sulfonating agent or otherwise to introduce anionic groups in the polymers, and besides polymers obtained by polymerizing anionic group-containing polymerizable monomers. Usually, the polyanion, from the viewpoint of the easiness of the production, is obtained, preferably by polymerizing an anionic group-containing polymerizable monomer. Examples of such a production method include a method of oxidatively polymerizing or radically polymerizing an anionic group-containing polymerizable monomer in the presence of an oxidizing agent and/or a polymerization catalyst. More specifically, a predetermined amount of an anionic group-containing polymerizable monomer is dissolved in a solvent; the solution is held at a certain temperature, and a solution in which predetermined amounts of an oxidizing agent and/or a polymerization catalyst are dissolved in advance is added thereto; and the resultant is reacted for a predetermined time. A polymer obtained by the reaction is regulated to a certain concentration by a catalyst. In this production method, a polymerizable monomer having no anionic groups can also be copolymerized with an anionic group-containing polymerizable monomer. The oxidizing agent and/or the oxidizing catalyst and the solvent to be used in the polymerization of the anionic group-containing polymerizable monomer are the same as those to be used when the precursor monomer to form (a) the π-conjugated conductive polymer is polymerized.

The anionic group-containing polymerizable monomer is a monomer having an anionic group and a polymerizable functional group in its molecule, and specifically includes vinylsulfonic acid and salts thereof, allylsulfonic acid and salts thereof, methallylsulfonic acid and salts thereof, styrenesulfonic acid and salts thereof, methallyloxybenzenesulfonic acid and salts thereof, allyloxybenzenesulfonic acid and salts thereof, α-methylstyrenesulfonic acid and salts thereof, acrylamide-t-butylsulfonic acid and salts thereof, 2-acrylamide-2-methylpropanesulfonic acid and salts thereof, cyclobutene-3-sulfonic acid and salts thereof, isoprenesulfonic acid and salts thereof, 1,3-butadiene-1-sulfonic acid and salts thereof, 1-methyl-1,3-butadiene-2-sulfonic acid and salts thereof, 1-methyl-1,3-butadiene-4-sulfonic acid and salts thereof, acryloyloxyethylsulfonic acid ($CH_2CH-COO-(CH_2)_2-SO_3H$) and salts thereof, acryloyloxypropylsulfonic acid ($CH_2CH-COO-(CH_2)_3-SO_3H$) and salts thereof, acryloyloxy-t-butylsulfonic acid ($CH_2CH-COO-C(CH_3)_2CH_2-SO_3H$) and salts thereof, acryloyloxy-n-butylsulfonic acid ($CH_2CH-COO-(CH_2)_4-SO_3H$) and salts thereof, 3-butenoyloxyethylsulfonic acid ($CH_2CHCH_2-COO-(CH_2)_2-SO_3H$) and salts thereof, 3-butenoyloxy-t-butylsulfonic acid ($CH_2CHCH_2-COO-C(CH_3)_2CH_2-SO_3H$) and salts thereof, 4-pentenoyloxyethylsulfonic acid ($CH_2CH(CH_2)_2-COO-(CH_2)_2-SO_3H$) and salts thereof, 4-pentenoyloxypropylsulfonic acid ($CH_2CH(CH_2)_2-COO-(CH_2)_3-SO_3H$) and salts thereof, 4-pentenoyloxy-n-butylsulfonic acid ($CH_2CH(CH_2)_2-COO-(CH_2)_4-SO_3H$) and salts thereof, 4-pentenoyloxy-t-butylsulfonic acid ($CH_2CH(CH_2)_2-COO-C(CH_3)_2CH_2-SO_3H$) and salts thereof, 4-pentenoyloxyphenylenesulfonic acid ($CH_2CH(CH_2)_2-COO-C_6H_4-SO_3H$) and salts thereof, 4-pentenoyloxynaphthalenesulfonic acid ($CH_2CH(CH_2)_2-COO-C_{10}H_8-SO_3H$) and salts thereof, methacryloyloxyethylsulfonic acid ($CH_2C(CH_3)-COO-(CH_2)_2-SO_3H$) and salts thereof, methacryloyloxypropylsulfonic acid ($CH_2C(CH_3)-COO-(CH_2)_3-SO_3H$) and salts thereof, methacryloyloxy-t-butylsulfonic acid ($CH_2C(CH_3)-COO-C(CH_3)_2CH_2-SO_3H$) and salts thereof, methacryloyloxy-n-butylsulfonic acid ($CH_2C(CH_3)-COO-(CH_2)_4-SO_3H$) and salts thereof, methacryloyloxyphenylenesulfonic acid ($CH_2C(CH_3)-COO-C_6H_4-SO_3H$) and salts thereof, and methacryloyloxynaphthalenesulfonic acid ($CH_2C(CH_3)-COO-C_{10}H_8-SO_3H$) and salts thereof. Further, the anionic group-containing polymerizable monomer may be a copolymer containing two or more thereof.

The polymerizable monomer having no anionic groups includes ethylene, propene, 1-butene, 2-butene, 1-pentene, 2-pentene, 1-hexene, 2-hexene, styrene, p-methylstyrene, p-ethylstyrene, p-butylstyrene, 2,4,6-trimethylstyrene, p-methoxystyrene, α-methylstyrene, 2-vinylnaphthalene, 6-methyl-2-vinylnaphthalene, 1-vinylimidazole, vinylpyridine, vinyl acetate, acrylaldehyde, acrylnitrile, N-vinyl-2-pyrrolidone, N-vinylacetamide, N-vinylformamide, N-vinylimidazole, acrylamide, N,N-dimethylacrylamide, acrylic acid, methyl acrylate, ethyl acrylate, propyl acrylate, n-butyl acrylate, isobutyl acrylate, t-butyl acrylate, isooctyl acrylate, isononylbutyl acrylate, lauryl acrylate, allyl acrylate, stearyl acrylate, isobonyl acrylate, cyclohexyl acrylate, benzyl acrylate, ethyl carbitol acrylate, phenoxyethyl acrylate, hydroxyethyl acrylate, methoxyethyl acrylate, ethoxyethyl acrylate, methoxybutyl acrylate, methacrylic acid, methyl methacrylate, ethyl methacrylate, n-butyl methacrylate, isobutyl methacrylate, t-butyl methacrylate, 2-ethylhexyl methacrylate, lauryl methacrylate, tridecyl methacrylate, stearyl methacrylate, cyclohexyl methacrylate, benzyl methacrylate, 2-hydroxyethyl methacrylate, 2-hydroxypropyl methacrylate, acryloylmorpholine, vinylamine, N,N-dimethylvinylamine, N,N-diethylvinylamine, N,N-dibutylvinylamine, N,N-di-t-butylvinylamine, N,N-diphenylvinylamine, N-vinylcarbazole, vinyl alcohol, vinyl chloride, vinyl fluoride, methyl vinyl ether, ethyl vinyl ether, cyclopropene, cyclobutene, cyclopentene, cyclohexene, cycloheptene, cyclooctene, 2-methylcyclohexene, vinylphenol, 1,3-butadiene, 1-methyl-1,3-butadiene, 2-methyl-1,3-butadiene, 1,4-dimethyl-1,3-butadiene, 1,2-dimethyl-1,3-butadiene, 1,3-dimethyl-1,3-butadiene, 1-octyl-1,3-butadiene, 2-octyl-1,3-butadiene, 1-phenyl-1,3-butadiene, 2-phenyl-1,3-butadiene, 1-hydroxy-1,3-butadiene, and 2-hydroxy-1,3-butadiene.

The degree of polymerization of the polyanion thus obtained is not especially limited, but is usually about 10 to 100,000 in monomer units, and considering that solubilization in solvent, dispersibility and conductivity become good, more preferably about 50 to 10,000.

Specific examples of the polyanion suitably include polyvinylsulfonic acid, polystyrenesulfonic acid, polyisoprenesulfonic acid, polyacryloyloxyethylsulfonic acid, polyacryloyloxybutylsulfonic acid, and poly(2-acrylamide-2-methyl-1-propanesulfonic acid). When an obtained anionic compound is an anionic salt, the anionic compound is preferably converted to an anionic acid. Methods for converting it to the anionic acid include ion exchange methods using ion-exchange resins, dialysis methods and ultrafiltration methods. Among these methods, from the viewpoint of the easiness of work, an ultrafiltration method is preferable. However, when the metal ion concentration needs to be reduced, an ion exchange method is used.

As a combination of (a) the π-conjugated conductive polymer and (b) the polyanion, a combination of those selected from each group of (a) and (b) can be used, but from the viewpoint of the chemical stability, the conductivity, the storage stability, the easiness of availability and the like, a combination of poly(3,4-ethylenedioxythiophene) as an example of (a) the π-conjugated conductive polymer and polystyrenesulfonic acid as an example of (b) the polyanion is preferable. The poly(3,4-ethylenedioxythiophene) and the polystyrenesulfonic acid may be synthesized, as described above, by carrying out the polymerization in the state of an aqueous solution or a water dispersion in which a monomer for the conductive polymer and the dopant coexist, in the presence of an oxidizing agent. Alternatively, a commercially available water dispersion of a conductive polymer and dopant complex may be used.

The content of the polyanion is, with respect to 1 g of the π-conjugated conductive polymer, preferably in the range of 0.1 to 10 g, and more preferably in the range of 1 to 7 g. By making the content of the polyanion to be 0.1 g or higher, the doping effect on the π-conjugated conductive polymer can be enhanced and the conductivity can be enhanced. Additionally, the solubility in a solvent becomes high and it becomes easy for a solution of a conductive polymer in a homogeneous dispersion form to be obtained. On the other hand, when the content of the polyanion is made to be 10 g or lower, the content proportion of the π-conjugated conductive polymer can be made relatively high and a higher conductivity can be exhibited.

(c) The Compound Represented by the Chemical Formula (1)

As the compound (epoxy group-containing unsaturated compound) represented by the chemical formula (1), compounds having any molecular structure suffice as long as having an epoxy group and a functional group having an unsaturated bond, more preferably a polymerizable carbon-carbon double bond, in their molecule. Further, it is more preferable if the epoxy group-containing unsaturated compound can coordinate to or bond with an anionic group or an electron-withdrawing group of the polyanion. The molecular weight of the epoxy group-containing unsaturated compound is, in consideration of the easy solubility in an organic solvent, preferably in the range of 50 to 2,000. The amount of the epoxy group-containing unsaturated compound is, with respect to the anionic group or the electron-withdrawing group in the polyanion of the π-conjugated conductive polymer, preferably 0.1 to 50, and more preferably 1.0 to 30.0, in weight ratio. When the amount of the epoxy group-containing unsaturated compound is made to be 0.1 or larger in the above weight ratio, the epoxy group-containing unsaturated compound can be modified to such a degree that the anionic group of the polyanion is dissolved in a solvent. On the other hand, when the amount of the epoxy group-containing unsaturated compound is made to be 50 or smaller in the above weight ratio, since the surplus epoxy group-containing unsaturated compound hardly deposits in a conductive polymer solution, the decreases in the conductivity and the mechanical properties of an obtained coating film are easily prevented.

The epoxy group-containing unsaturated compound is not especially limited as long as it has a molecular structure of the chemical formula (1); and in particular, such a compound having a molecular structure of the chemical formula (2) can be employed. In order to solubilize the compound in a low-polarity organic solvent, however, the compound is effective if it has a large number of carbon atoms. Suitably, compounds having 6 or more carbon atoms are used. R in the chemical formula (1) is more preferably a hydrocarbon group or an alkoxy group which has an unsaturated bond, preferably a carbon-carbon double bond, and may contain substituents, and may be linear, branched or cyclic. Further, $R^1$ in the chemical formula (2) is any functional group that is not particularly limited, and more preferably a hydrocarbon group or an alkoxy group which may contain substituents, and may be a saturated hydrocarbon group or an unsaturated hydrocarbon group, and may be linear, branched or cyclic. The epoxy group-containing unsaturated compound is preferably one particularly in which R is an unsaturated hydrocarbon group, particularly a linear unsaturated hydrocarbon group, more particularly a linear unsaturated hydrocarbon group having 3 or more carbon atoms, and still more particularly a linear unsaturated hydrocarbon group having 3 to 21 carbon atoms. Further, the epoxy group-containing unsaturated compound is preferably one particularly in which $R^1$ is a saturated hydrocarbon group, particularly a linear saturated hydrocarbon group, more particularly a linear saturated hydrocarbon group having 1 or more carbon atoms, and still more particularly a linear saturated hydrocarbon group having 1 to 19 carbon atoms.

Here, examples of suitable R include linear or branched alkenyl groups such as a vinyl group, a 1-propenyl group, an allyl group, an isopropenyl group, a 1-butenyl group, a 2-butenyl group, a pentenyl group and a hexenyl group; cycloalkenyl groups such as a cyclopentenyl group and a cyclohexenyl group; cycloalkenylalkyl groups such as a cyclopentenylethyl group, a cyclohexenylethyl group and a cyclohexenylpropyl group; and alkynyl groups such as an ethynyl group and a propargyl group.

Further, suitable $R^1$ includes linear or branched alkylene groups such as a methylene group, an ethylene group, a n-propylene group, an isopropylene group, a n-butylene group, an isobutylene group, a sec-butylene group, a tert-butylene group, a pentylene group, a hexylene group, a heptylene group, an octylene group, a nonylene group and a decylene group; and cycloalkylene groups such as a cyclopentylene group, a cyclohexylene group, a cycloheptylene group and a cyclooctylene group.

The large characteristic of the present invention consists in that 1) the compound represented by the chemical formula (1) is contained, and 2) moisture has been removed or reduced. The achievement of these 1) and 2) requirements leads to that the solubilization in an organic solvent is achieved in the state of a little moisture; the mixing with an organic resin is possible; the effect of being capable of improving the adhesiveness to a substrate in use with an addition-type silicone; and further the improvement of the conductivity can be developed.

Hereinafter, the epoxy group-containing unsaturated compound will be exemplified. However, the epoxy group-containing unsaturated compound in the present application is not limited to the following exemplification. As the epoxy group-containing unsaturated compound, allyl glycidyl ether, methacryl glycidyl ether, 1,2-epoxy-1-methyl-4-isopropenylcyclohexane, 1,2-epoxycyclohexane, 1,2-epoxy-4-vinylcyclohexane, 2,3-epoxy-5-vinylnorbornane, 1,2-epoxy-3-butene, 1,2-epoxy-5-hexene, 1,2-epoxy-9-decene and 2,6-dimethyl-2,3-epoxy-7-octene are exemplified. Among these, 1,2-epoxy-5-hexene and 1,2-epoxy-9-decene are more preferable.

(d) The Addition-Curable Organopolysiloxane Composition

The addition-curable organopolysiloxane composition contains, for example, a silicone rubber (crude rubber or the like) having a vinyl group on its terminal, a crosslinking agent having a Si—H group, and an addition reaction catalyst. With respect to the weight ratio of a conductive polymer complex containing (a) the π-conjugated conductive polymer, (b) the polyanion and (c) the compound represented by the chemical formula (1) to (d) the addition-curable organopolysiloxane composition, the conductive polymer complex is, with respect to 100 parts by mass of (d) the addition-curable organopolysiloxane composition, 0.01 to 50 parts by mass, preferably 0.1 to 30 parts by mass, and more preferably 1 to 20 parts by mass. The crosslinking agent is an organohydrogenpolysiloxane having a Si—H group, and either of a linear or branched one can be used. The addition reaction catalyst includes platinum-based catalysts such as chloroplatinic acid, alcohol solutions of chloroplatinic acid, reaction products of chloroplatinic acid with alcohols, reaction products of chloroplatinic acid with olefin compounds, reaction products of chloroplatinic acid with vinyl group-containing siloxanes, platinum-olefin complexes and platinum-vinyl group-containing siloxane complexes, and platinum group metal-based catalysts such as rhodium complexes and ruthenium complexes. Further, catalysts prepared by dissolving or dispersing these in a solvent such as isopropanol or toluene, a silicone oil or the like can be used. One example of the addition-curable organopolysiloxane composition contains a) an organopolysiloxane having at least two alkenyl groups in its molecule, b) an organopolysiloxane having at least three hydrosilyl groups in its molecule, and c) a hydrosilylation catalyst composed mainly of a modification or complex of a platinum group metal such as platinum, palladium, or rhodium.

(e) Others

The addition-curable antistatic organopolysiloxane composition according to the embodiment can comprise, in addition to the above (a) to (d) components, for example, the following components.

(e.1) an Organic Solvent

An organic solvent, unlike the above (a) to (d) components, may or may not be contained in the addition-curable antistatic organopolysiloxane composition according to the embodiment. As organic solvents to be used for solubilizing or dispersing the addition-curable antistatic organopolysiloxane composition, polar solvents represented by N-methyl-2-pyrrolidone, N,N-dimethylformamide, N,N-dimethylacetamide, dimethyl sulfoxide, hexamethylene phosphonium triamide, acetonitrile, benzonitrile and the like; phenols represented by cresol, phenol, xylenol and the like; alcohols represented by methanol, ethanol, propanol, butanol and the like; ketones represented by acetone, methyl ethyl ketone, methyl isobutyl ketone and the like; esters represented by ethyl acetate, propyl acetate, butyl acetate and the like; hydrocarbons represented by hexane, heptane, benzene, toluene, xylene and the like; carboxylic acids represented by formic acid, acetic acid and the like; carbonate compounds represented by ethylene carbonate, propylene carbonate and the like; ether compounds represented by dioxane, diethyl ether and the like; linear ethers represented by ethylene glycol dialkyl ethers, propylene glycol dialkyl ethers, polyethylene glycol dialkyl ethers, polypropylene glycol dialkyl ethers and the like; heterocyclic compounds represented by 3-methyl-2-oxazolidinone and the like; and nitrile compounds represented by acetonitrile, glutarodinitrile, methoxyacetonitrile, propionitrile, benzonitrile and the like can suitably be exemplified. These organic solvents may be used singly or as a mixture of two or more thereof.

Among these organic solvents, from the viewpoint of easy miscibility with various types of organic substances, alcohols, ketones, ethers, esters and hydrocarbons can more suitably be used. When a coating film is formed by using the addition-curable antistatic organopolysiloxane composition, the coating material is produced by dispersing and solubilizing the addition-curable antistatic organopolysiloxane composition in an organic solvent and applied on a substrate, and a part of or the whole of the organic solvent is removed. Therefore, an organic solvent having a low boiling point is suitably selected. Thereby, the dry time in the coating film formation can be shortened and the productivity of the coating film can thus be enhanced.

(e.2) A Conductivity Improver

When the addition-curable antistatic organopolysiloxane composition is produced, in order to more improve the conductivity of a coating film, one or more conductivity improvers selected from compounds of the following (e.2.1) to (e.2.7) are preferably added.

(e.2.1) A nitrogen-containing aromatic cyclic compound
(e.2.2) A compound having two or more hydroxy groups
(e.2.3) A compound having two or more carboxy groups
(e.2.4) A compound having one or more hydroxy groups and one or more carboxy groups
(e.2.5) A compound having an amido group
(e.2.6) A compound having an imido group
(e.2.7) A lactam compound (e.2.1) the Nitrogen-Containing Aromatic Cyclic Compound The nitrogen-containing aromatic cyclic compound suitably includes pyridines, which contain one nitrogen atom, and derivatives thereof, imidazoles, pyrimidines and pyrazines, which contain two nitrogen atoms, and derivatives thereof, and triazines, which contain three nitrogen atoms, and derivatives thereof. From the viewpoint of the solubility in a solvent, and the like, pyridines and derivatives thereof, imidazoles and derivatives thereof, and pyrimidines and derivatives thereof are preferable.

Specific examples of pyridines and derivatives thereof include pyridine, 2-methylpyridine, 3-methylpyridine, 4-methylpyridine, 4-ethylpyridine, N-vinylpyridine, 2,4-dimethylpyridine, 2,4,6-trimethylpyridine, 3-cyano-5-methylpyridine, 2-pyridinecarboxylic acid, 6-methyl-2-pyridinecarboxylic acid, 4-pyridinecarboxaldehyde, 4-aminopyridine, 2,3-diaminopyridine, 2,6-diaminopyridine, 2,6-diamino-4-methylpyridine, 4-hydroxypyridine, 4-pyridinemethanol, 2,6-dihydroxypyridine, 2,6-pyridinedimethanol, methyl 6-hydroxynicotinate, 2-hydroxy-5-pyridinemethanol, ethyl 6-hydroxynicotinate, 4-pyridinemethanol, 4-pyridineethanol, 2-phenylpyridine, 3-methylquinoline, 3-ethylquinoline, quinolinol, 2,3-cyclopentenopyridine, 2,3-cyclohexanopyridine, 1,2-di(4-pyridyl)ethane, 1,2-di(4-pyridyl)propane, 2-pyridinecarboxyaldehyde, 2-pyridinecarboxylic acid, 2-pyridinecarbonitrile, 2,3-pyridinedicarboxylic acid, 2,4-pyridinedicarboxylic acid, 2,5-pyridinedicarboxylic acid, 2,6-pyridinedicarboxylic acid, and 3-pyridinesulfonic acid.

Specific examples of imidazoles and derivatives thereof include imidazole, 2-methylimidazole, 2-propylimidazole, 2-undecylimidazole, 2-phenylimidazole, N-methylimidazole, N-vinylimidazole, N-allylimidazole, 1-(2-hydroxyethyl)imidazole (N-hydroxyethylimidazole), 2-ethyl-4-methylimidazole, 1,2-dimethylimidazole, 1-benzyl-2-methylimidazole, 1-benzyl-2-phenylimidazole, 1-cyanoethyl-2-methylimidazole, 1-cyanoethyl-2-ethyl-4-methylimidazole, 2-phenyl-4,5-dihydroxymethylimidazole, 1-acetylimidazole, 4,5-imidazoledicarboxylic acid, dimethyl 4,5-imidazoledicarboxylate, benzimidazole, 2-aminobenzimidazole, 2-aminobenzimidazole-2-sulfonic acid, 2-amino-1-methylbenzimidazole, 2-hydroxybenzimidazole, and 2-(2-pyridyl)benzimidazole.

Specific examples of pyrimidines and derivatives thereof include 2-amino-4-chloro-6-methylpyrimidine, 2-amino-6-chloro-4-methoxypyrimidine, 2-amino-4,6-dichloropyrimidine, 2-amino-4,6-dihydroxypyrimidine, 2-amino-4,6-dimethylpyrimidine, 2-amino-4,6-dimethoxypyrimidine, 2-aminopyrimidine, 2-amino-4-methylpyrimidine, 4,6-dihydroxypyrimidine, 2,4-dihydroxypyrimidine-5-carboxylic acid, 2,4,6-triaminopyrimidine, 2,4-dimethoxypyrimidine, 2,4,5-trihydroxypyrimidine, and 2,4-pyrimidinediol.

Specific examples of pyrazines and derivatives thereof include pyrazine, 2-methylpyrazine, 2,5-dimethylpyrazine, pyrazinecarboxylic acid, 2,3-pyrazinedicarboxylic acid, 5-methylpyrazinecarboxylic acid, pyrazinamide, 5-methylpyrazinamide, 2-cyanopyrazine, aminopyrazine, 3-aminopyrazine-2-carboxylic acid, 2-ethyl-3-methylpyrazine, 2,3-dimethylpyrazine, and 2,3-diethylpyrazine.

Specific examples of triazines and derivatives thereof include 1,3,5-triazine, 2-amino-1,3,5-triazine, 3-amino-1,2,4-triazine, 2,4-diamino-6-phenyl-1,3,5-triazine, 2,4,6-triamino-1,3,5-triazine, 2,4,6-tris(trifluoromethyl)-1,3,5-triazine, 2,4,6-tri-2-pyridine-1,3,5-triazine, 3-(2-pyridine)-5,6-bis(4-phenylsulfonic acid)-1,2,4-triazine disodium, 3-(2-pyridine)-5,6-diphenyl-1,2,4-triazine, 3-(2-pyridine)-5,6-diphenyl-1,2,4-triazine-p,p'-disulfonic acid disodium, and 2-hydroxy-4,6-dichloro-1,3,5-triazine.

(e.2.2) the Compound Having Two or More Hydroxy Groups

Examples of the compound having two or more hydroxy groups include polyhydric aliphatic alcohols such as propylene glycol, 1,3-butylene glycol, 1,4-butylene glycol, glycerol, diglycerol, D-glucose, D-glucitol, isoprene glycol, dimethylolpropionic acid, butanediol, 1,5-pentanediol, 1,6-hexanediol, 1,9-nonanediol, neopentyl glycol, trimethylolethane, trimethylolpropane, pentaerythritol, dipentaerythritol, thiodiethanol, glucose, tartaric acid, D-glucaric acid and glutaconic acid; polymer alcohols such as cellulose, polysaccharide and sugar alcohols; and aromatic compounds such as 1,4-dihydroxybenzene, 1,3-dihydroxybenzene, 2,3-dihydroxy-1-pentadecylbenzene, 2,4-dihydroxyacetophenone, 2,5-dihydroxyacetophenone, 2,4-dihydroxybenzophenone, 2,6-dihydroxybenzophenone, 3,4-dihydroxybenzophenone, 3,5-dihydroxybenzophenone, 2,4'-dihydroxydiphenyl sulfone, 2,2',5,5'-tetrahydroxydiphenyl sulfone, 3,3',5,5'-tetramethyl-4,4'-dihydroxydiphenyl sulfone, hydroxyquinonecarboxylic acid and salts thereof, 2,3-dihydroxybenzoic acid, 2,4-dihydroxybenzoic acid, 2,5-dihydroxybenzoic acid, 2,6-dihydroxybenzoic acid, 3,5-dihydroxybenzoic acid, 1,4-hydroquinonesulfonic acid and salts thereof, 4,5-hydroxybenzene-1,3-disulfonic acid and salts thereof, 1,5-dihydroxynaphthalene, 1,6-dihydroxynaphthalene, 2,6-dihydroxynaphthalene, 2,7-dihydroxynaphthalene, 2,3-dihydroxynaphthalene, 1,5-dihydroxynaphthalene-2,6-dicarboxylic acid, 1,6-dihydroxynaphthalene-2,5-dicarboxylic acid, 1,5-dihydroxynaphthoic acid, a 1,4-dihydroxy-2-naphthoic acid phenyl ester, 4,5-dihydroxynaphthalene-2,7-disulfonic acid and salts thereof, 1,8-dihydroxy-3,6-naphthalenedisulfonic acid and salts thereof, 6,7-dihydroxy-2-naphthalenesulfonic acid and salts thereof, 1,2,3-trihydroxybenzene (pyrogallol), 1,2,4-trihydroxybenzene, 5-methyl-1,2,3-trihydroxybenzene, 5-ethyl-1,2,3-trihydroxybenzene, 5-propyl-1,2,3-trihydroxybenzene, trihydroxybenzoic acid, trihydroxyacetophenone, trihydroxybenzophenone, trihydroxybenzaldehyde, trihydroxyanthraquinone, 2,4,6-trihydroxybenzene, tetrahydroxy-p-benzoquinone, tetrahydroxyanthraquinone, methyl gallate and ethyl gallate; and potassium hydroquinonesulfonate.

(e.2.3) The Compound Having Two or More Carboxy Groups

Examples of the compound having two or more carboxy groups include aliphatic carboxylic acid compounds such as maleic acid, fumaric acid, itaconic acid, citraconic acid, malonic acid, 1,4-butanedicarboxylic acid, succinic acid, tartaric acid, adipic acid, D-glucaric acid, glutaconic acid and citric acid; aromatic carboxylic acid compounds whose aromatic ring has at least one or more carboxy groups bonded thereto, such as phthalic acid, terephthalic acid, isophthalic acid, tetrahydrophthalic anhydride, 5-sulfoisophthalic acid, 5-hydroxyisophthalic acid, methyltetrahydrophthalic anhydride, 4,4'-oxydiphthalic acid, biphenyltetracarboxylic dianhydride, benzophenonetetracarboxylic dianhydride, naphthalenedicarboxylic acid, trimellitic acid and pyromellitic acid; and diglycolic acid, oxydibutyric acid, thiodiacetic acid, thiodibutyric acid, iminodiacetic acid, and iminobutyric acid.

(e.2.4) The compound having one or more hydroxy groups and one or more carboxy groups The compound having one or more hydroxy groups and one or more carboxy groups includes tartaric acid, glyceric acid, dimethylolbutanoic acid, dimethylolpropanoic acid, D-glucaric acid, and glutaconic acid.

(e.2.5) The Compound Having an Amido Group

The compound having an amido group (referred to as amide compound) is a monomolecular compound having an amido bond represented by —CO—NH— (the part of CO is a double bond) in its molecule. That is, examples of the amide compound include compounds having functional groups on both terminals of the above bond, compounds in which a cyclic compound is bonded to one terminal of the above bond, and urea, in which functional groups of both the terminals are hydrogen, and urea derivatives. Specific examples of the amide compound include acetamide, malonamide, succinamide, maleamide, fumaramide, benzamide, naphthamide, phthalamide, isophthalamide, terephthalamide, nicotinamide, isonicotinamide, 2-furamide, formamide, N-methylformamide, propionamide, propiolamide, butyramide, isobutyramide, methacrylamide, palmitamide, stearylamide, oleamide, oxamide, glutaramide, adipamide, cinnamamide, glycolamide, lactamide, glyceramide, tartaramide, citramide, glyoxylamide, pyruvamide, acetoacetamide, dimethylacetamide, benzylamide, anthranilamide, ethylenediaminetetraacetamide, diacetamide, triacetamide, dibenzamide, tribenzamide, rhodanine, urea, 1-acetyl-2-thiourea, biuret, butylurea, dibutylurea, 1,3-dimethylurea, 1,3-diethylurea, and derivatives thereof.

As the amide compound, acrylamides can also be used. The acrylamides include N-methylacrylamide, N-methylmethacrylamide, N-ethylacrylamide, N-ethylmethacrylamide, N,N-dimethylacrylamide, N,N-dimethylmethacrylamide, N,N-diethylacrylamide, N,N-diethylmethacrylamide, 2-hydroxyethylacrylamide, 2-hydroxyethylmethacrylamide, N-methylolacrylamide, and N-methylolmethacrylamide. The molecular weight of the amide compound is preferably 46 to 10,000, more preferably 46 to 5,000, and especially preferably 46 to 1,000.

(e.2.6) the Compound Having an Imido Group

The compound having an imido group (referred to as imide compound) includes, from its skeleton, phthalimide and phthalimide derivatives, succinimide and succinimide derivatives, benzimide and benzimide derivatives, maleimide and maleimide derivatives, and naphthalimide and naphthalimide derivatives.

Further, the imide compound is, according to the kind of functional groups of both terminals, classified into aliphatic imides, aromatic imides and the like, but is, from the viewpoint of the solubility, preferably aliphatic imides. Further, the aliphatic imide compounds are classified into saturated aliphatic imide compounds having a saturated bond between carbon atoms in their molecule, and unsaturated aliphatic imide compounds having an unsaturated bond between carbon atoms in their molecule. The saturated aliphatic imide compounds are compounds represented by $R^3$—CO—NH—CO—$R^4$, wherein both of $R^3$ and $R^4$ are saturated hydrocarbons. Specific examples thereof include cyclohexane-1,2-dicarboxyimide, allantoin, hydantoin, barbituric acid, alloxan, glutarimide, succinimide, 5-butylhydantoic acid, 5,5-dimethylhydantoin, 1-methylhydantoin, 1,5,5-trimethylhydantoin, 5-hydantoin acetic acid, N-hydroxy-5-norbornene-2,3-dicarboxyimide, semicarbazide, α,α-dimethyl-6-methylsuccinimide, bis[2-(succinimideoxycarbonyloxy)ethyl] sulfone, α-methyl-α-propylsuccinimide, and cyclohexylimide. The unsaturated aliphatic imide compounds are compounds represented by $R^3$—CO—NH—CO—$R^4$, wherein one of or both of $R^3$ and $R^4$ have one or more unsaturated bonds. Specific examples thereof include 1,3-dipropyleneurea, maleimide, N-methylmaleimide, N-ethylmaleimide, N-hydroxymaleimide, 1,4-bismaleimidebutane, 1,6-bismaleimidehexane, 1,8-bismaleimideoctane, and N-carboxyheptylmaleimide.

The molecular weight of the imide compound is preferably 60 to 5,000, more preferably 70 to 1,000, and especially preferably 80 to 500.

(e.2.7) the Lactam Compound

The lactam compound is a cyclic amide intramolecularly formed from an aminocarboxylic acid, and a compound in which a part of the ring is —CO—NR$^5$— (R$^5$ is hydrogen or an arbitrary substituent). Here, one or more carbon atoms of the ring may be replaced by an unsaturated bond or a heteroatom. Examples of the lactam compound include pentano-4-lactam, 4-pentane lactam-5-methyl-2-pyrrolidone, 5-methyl-2-pyrrolidinone, hexano-6-lactam, and 6-hexane lactam.

The content of the conductivity improver is, with respect to 100 parts by mass of the conductive component, preferably 10 to 10,000 parts by mass, and more preferably 30 to 5,000 parts by mass. When the content of the conductivity improver is the lower limit value or higher and the upper limit value or lower, the antistaticity can be improved more.

<B. An Embodiment of an Antistatic Silicone Film>

An antistatic silicone film according to an embodiment of the present invention is a film made by reducing an organic solvent from the above-mentioned addition-curable antistatic organopolysiloxane composition (in a form containing the organic solvent) and curing the composition. When the addition-curable antistatic organopolysiloxane composition is a solid, a coating material of an antistatic silicone composition is prepared from a solution in which the addition-curable antistatic organopolysiloxane composition is dissolved or dispersed in a solvent mainly containing an organic solvent. When the addition-curable antistatic organopolysiloxane composition is a solution in the state that the composition is already dissolved or dispersed in a solvent mainly containing an organic solvent, the composition as it is, or the composition further diluted with an organic solvent is prepared as a coating material of an antistatic silicone composition. The coating material is supplied on a substrate represented by paper, plastic, iron, ceramic or glass. As supply methods, various types of means such as applying methods using a brush or a bar coater, dip methods of dipping a substrate in a coating material, and spin coat methods of dropping a coating material on a substrate and rotating the substrate to extend the coating material can be exemplified. As curing methods of a coating material on a substrate, methods of removing an organic solvent by heating, and besides, methods of curing by irradiating light such as ultraviolet rays, or electron beams can be exemplified.

As described above, since the addition-curable antistatic organopolysiloxane composition according to the embodiment comprises the compound represented by the chemical formula (1) and the addition-curable organopolysiloxane composition, more preferably comprises the reaction product of the polyanion with the compound represented by the chemical formula (1), the addition-curable antistatic organopolysiloxane composition is dispersible in or soluble in various solvents mainly containing an organic solvent. Further, as compared with compositions obtained by conventionally known methods of carrying out the solvent replacement by the reaction with a polyanion residue in a conductive polymer water dispersion using an amine-based compound, the addition-curable antistatic organopolysiloxane composition is excellent in the storage stability and the stability of the electric resistance, and can be applied even to the fields where amines and the like become hindrances to reactions.

EXAMPLES

Then, Production Examples and Examples according to the present invention will be described. However, the present invention is not limited to the following Examples.

PRODUCTION EXAMPLES (Production Example 1) . . . Production of a Polystyrenesulfonic Acid 206 g of sodium styrenesulfonate was dissolved in 1,000 ml of ion-exchange water; and an oxidizing agent solution in which 1.14 g of an ammonium persulfate was in advance dissolved in 10 ml of water was dropped over 20 min under stirring at 80° C., and the resultant solution was stirred for 12 hours. 1,000 ml of sulfuric acid diluted to 10% by mass was added to the resultant sodium styrenesulfonate-containing solution; 1,000 ml of a solution was removed from the polystyrenesulfonic acid-containing solution by an ultrafiltration method; 2,000 ml of ion-exchange water was added to the residue liquid; and about 2,000 ml of a solution was removed by an ultrafiltration method. This ultrafiltration operation was repeated three times. Further, about 2,000 ml of ion-exchange water was added to the obtained filtrate; and about 2,000 ml of a solution was removed by an ultrafiltration method. This ultrafiltration operation was repeated three times. Water in the obtained solution was removed under reduced pressure to thereby obtain a colorless solid substance. For the obtained polystyrenesulfonic acid, the weight-average molecular weight was measured in a HPLC (high performance liquid chromatography) system using a GPC (gel filtration chromatography) column with pullulan manufactured by Showa Denko K.K. as a standard substance, and was 300,000.

(Production Example 2) . . . Production of a PEDOT-PSS Aqueous Solution 14.2 g of 3,4-ethylenedioxythiophene and a solution in which 36.7 g of the polystyrenesulfonic acid obtained in Production Example 1 was dissolved in 2,000 ml of ion-exchange water were mixed at 20° C. While the thus obtained mixed solution was held at 20° C. under stirring, an oxidation catalyst solution in which 29.64 g of ammonium persulfate and 8.0 g of ferric sulfate were dissolved in 200 ml of ion-exchange water was slowly added, and stirred for 3 hours for the reaction. 2,000 ml of ion-exchange water was added to the obtained reaction solution; and about 2,000 ml of a solution was removed by an ultrafiltration method. This operation was repeated three times. Then, 200 ml of sulfuric acid diluted to 10% by mass and 2,000 ml of ion-exchange water were added to the obtained solution; about 2,000 ml of a solution was removed by an ultrafiltration method; 2,000 ml of ion-exchange water was added thereto; and about 2,000 ml of a solution was removed by an ultrafiltration method. This operation was repeated three times. Further, 2,000 ml of ion-exchange water was added to the obtained solution; and about 2,000 ml of a solution was removed by an ultrafiltration method. This operation was repeated five times to thereby obtain an about 1.2-mass % blue PEDOT-PSS aqueous solution.

Production Example 3

100 g of the PEDOT-PSS aqueous solution obtained in Production Example 2, 100 g of methanol and 25 g of 1,2-epoxy-5-hexene were mixed, and stirred at 60° C. for 4 hours by a stirrer; and the deposited solid substance was filtered. 150 g of methyl ethyl ketone was added to the obtained solid substance, and dispersed under high pressure to thereby obtain a 0.5%-concentration conductive polymer solution.

Production Example 4

100 g of the PEDOT-PSS aqueous solution obtained in Production Example 2, 100 g of methanol and 25 g of 1,2-epoxy-9-decene were mixed, and stirred at 60° C. for 4 hours by a stirrer; and the deposited solid substance was filtered. 150 g of methyl ethyl ketone was added to the obtained solid substance, and dispersed under high pressure to thereby obtain a 0.5%-concentration conductive polymer solution.

Production Example 5

100 g of the PEDOT-PSS aqueous solution obtained in Production Example 2, 100 g of methanol and 25 g of a C12-C13-mixed higher alcohol glycidyl ether were mixed, and stirred at 60° C. for 4 hours by a stirrer; and the deposited solid substance was filtered. 150 g of methyl ethyl ketone was added to the obtained solid substance to thereby obtain a 0.5%-concentration conductive polymer solution.
<Evaluation Methods>
(Peeling Strength)
An obtained coating material (referred to also as release agent) was applied on a 38 μm-thickness PET film by a bar coater (No. 4), and heated for 1 min in a hot-air dryer at 120° C. to thereby form a release agent layer. Then, a polyester pressure-sensitive adhesive tape (trade name: Nitto No. 31B, manufactured by Nitto Denko Corp.) of 2.5 cm×15 cm was mounted on the surface of the release agent layer; then, the polyester pressure-sensitive adhesive tape was pasted together on the release agent layer by pressure-bonding on the pressure-sensitive adhesive tape by using a roller of 2 kg. Thereafter, the resultant was allowed to be left at room temperature for 20 hours, or subjected to a heat treatment at 85° C. for 20 hours to thereby fabricate a test piece. Then, the polyester pressure-sensitive adhesive tape was peeled (peeling rate: 0.3 m/min) at an angle of 180° off the release agent layer, and the peeling strength was measured, by using a tensile tester. The lower the peeling strength, the more easily the pressure-sensitive adhesive sheet can be peeled off (that is, lightly peelable) after the pressure-sensitive adhesive sheet is pasted together on the release agent layer.
(Surface Resistivity)
The surface resistivity was measured by using a probe MCP-HTP12 at an application voltage of 10 V by using Hiresta MCP-HT450, manufactured by Mitsubishi Chemical Corp. Here, "OVER" in Table means that the surface resistivity was too high and could not be measured.
(Adhesiveness)
The surface condition was checked by strongly scrubbing the obtained film. The case where no change was observed in a coating film was taken as "Circle"; the case where white streaks remained was taken as "Triangle"; and the case where the coating film was entirely peeled off was taken as "X". Here, it was meant that the adhesiveness was stronger in the order of "Circle", "Triangle" and "X".

EXAMPLES

Example 1

To 6.0 g of the conductive polymer solution obtained in Production Example 3, 1.0 g of KS-778 (manufactured by Shin-Etsu Chemical Co., Ltd., solid content: 30%, toluene solution), 36.0 g of methyl ethyl ketone, 17.0 g of toluene and 0.02 g of CAT-PL-50T (manufactured by Shin-Etsu Chemical Co., Ltd., platinum catalyst) were added to thereby fabricate a coating material. The obtained coating material was applied on an untreated PET film (manufactured by Toray Industries, Inc., Lumilar T60) by using a #8 bar coater, and dried at 150° C. for 1 min. The surface resistivity, the adhesiveness and the peeling strength of the obtained coating film are shown in Table 1.

Example 2

A coating film was fabricated similarly as in Example 1, except for altering KS-778 to KS-3703T (manufactured by Shin-Etsu Chemical Co., Ltd., solid content: 30%, toluene solution). The surface resistivity, the adhesiveness and the peeling strength of the obtained coating film are shown in Table 1.

Example 3

A coating film was fabricated similarly as in Example 1, except for altering KS-778 to KS-847H (manufactured by Shin-Etsu Chemical Co., Ltd., solid content: 30%, toluene solution). The surface resistivity, the adhesiveness and the peeling strength of the obtained coating film are shown in Table 1.

Example 4

To 3.0 g of the conductive polymer solution obtained in Production Example 3, 1.0 g of KS-778, 39.0 g of methyl ethyl ketone, 17.0 g of toluene and 0.02 g of CAT-PL-50T were added to thereby fabricate a coating material. The obtained coating material was applied on an untreated PET film (manufactured by Toray Industries, Inc., Lumilar T60) by using a #8 bar coater, and dried at 150° C. for 1 min. The surface resistivity, the adhesiveness and the peeling strength of the obtained coating film are shown in Table 1.

Example 5

A coating film was fabricated similarly as in Example 4, except for altering KS-778 to KS-3703T. The surface resistivity, the adhesiveness and the peeling strength of the obtained coating film are shown in Table 1.

Example 6

A coating film was fabricated similarly as in Example 4, except for altering KS-778 to KS-847H. The surface resistivity, the adhesiveness and the peeling strength of the obtained coating film are shown in Table 1.

Example 7

To 6.0 g of the conductive polymer solution obtained in Production Example 4, 1.0 g of KS-778, 36.0 g of methyl ethyl ketone, 17.0 g of toluene and 0.02 g of CAT-PL-50T were added to thereby fabricate a coating material. The obtained coating material was applied on an untreated PET film (manufactured by Toray Industries, Inc., Lumilar T60) by using a #8 bar coater, and dried at 150° C. for 1 min. The surface resistivity, the adhesiveness and the peeling strength of the obtained coating film are shown in Table 1.

Example 8

A coating film was fabricated similarly as in Example 7, except for altering KS-778 to KS-3703T. The surface resistivity, the adhesiveness and the peeling strength of the obtained coating film are shown in Table 1.

Example 9

A coating film was fabricated similarly as in Example 7, except for altering KS-778 to KS-847H. The surface resistivity, the adhesiveness and the peeling strength of the obtained coating film are shown in Table 1.

Example 10

To 3.0 g of the conductive polymer solution obtained in Production Example 4, 1.0 g of KS-778, 39.0 g of methyl ethyl ketone, 17.0 g of toluene and 0.02 g of CAT-PL-50T were added to thereby fabricate a coating material. The obtained coating material was applied on an untreated PET film (manufactured by Toray Industries, Inc., Lumilar T60) by using a #8 bar coater, and dried at 150° C. for 1 min. The surface resistivity, the adhesiveness and the peeling strength of the obtained coating film are shown in Table 1.

Example 11

A coating film was fabricated similarly as in Example 10, except for altering KS-778 to KS-3703T. The surface resistivity, the adhesiveness and the peeling strength of the obtained coating film are shown in Table 1.

Example 12

A coating film was fabricated similarly as in Example 10, except for altering KS-778 to KS-847H. The surface resistivity, the adhesiveness and the peeling strength of the obtained coating film are shown in Table 1.

COMPARATIVE EXAMPLES

Comparative Example 1

A coating film was fabricated similarly as in Example 1, except for altering the conductive polymer solution to methyl ethyl ketone. The surface resistivity, the adhesiveness and the peeling strength of the obtained coating film are shown in Table 1.

Comparative Example 2

A coating film was fabricated similarly as in Example 2, except for altering the conductive polymer solution to methyl ethyl ketone. The surface resistivity, the adhesiveness and the peeling strength of the obtained coating film are shown in Table 1.

Comparative Example 3

A coating film was fabricated similarly as in Example 3, except for altering the conductive polymer solution to methyl ethyl ketone. The surface resistivity, the adhesiveness and the peeling strength of the obtained coating film are shown in Table 1.

Comparative Example 4

To 6.0 g of the conductive polymer solution obtained in Production Example 5, 1.0 g of KS-778, 36.0 g of methyl ethyl ketone, 17.0 g of toluene and 0.02 g of CAT-PL-50T were added to thereby fabricate a coating material. The obtained coating material was applied on an untreated PET film (manufactured by Toray Industries, Inc., Lumilar T60) by using a #8 bar coater, and dried at 150° C. for 1 min. The surface resistivity, the adhesiveness and the peeling strength of the obtained coating film are shown in Table 1.

Comparative Example 5

A coating film was fabricated similarly as in Comparative Example 4, except for altering KS-778 to KS-3703T. The surface resistivity, the adhesiveness and the peeling strength of the obtained coating film are shown in Table 1.

Comparative Example 6

A coating film was fabricated similarly as in Comparative Example 4, except for altering KS-778 to KS-847H. The surface resistivity, the adhesiveness and the peeling strength of the obtained coating film are shown in Table 1.

Comparative Example 7

To 3.0 g of the conductive polymer solution obtained in Production Example 5, 1.0 g of KS-778, 39.0 g of methyl ethyl ketone, 17.0 g of toluene and 0.02 g of CAT-PL-50T were added to thereby fabricate a coating material. The obtained coating material was applied on an untreated PET film (manufactured by Toray Industries, Inc., Lumilar T60) by using a #8 bar coater, and dried at 150° C. for 1 min. The surface resistivity, the adhesiveness and the peeling strength of the obtained coating film are shown in Table 1.

Comparative Example 8

A coating film was fabricated similarly as in Comparative Example 7, except for altering KS-778 to KS-3703T. The surface resistivity, the adhesiveness and the peeling strength of the obtained coating film are shown in Table 1.

Comparative Example 9

A coating film was fabricated similarly as in Comparative Example 7, except for altering KS-778 to KS-847H. The surface resistivity, the adhesiveness and the peeling strength of the obtained coating film are shown in Table 1.

TABLE 1

| | Surface Resistance ($\Omega$/square) | Adhesiveness | Peeling Strength (N/25 mm) |
|---|---|---|---|
| Example 1 | $4 \times 10^6$ | ◯ | 0.08 |
| Example 2 | $7 \times 10^6$ | ◯ | 0.07 |
| Example 3 | $5 \times 10^6$ | ◯ | 0.09 |
| Example 4 | $7 \times 10^8$ | ◯ | 0.05 |
| Example 5 | $4 \times 10^9$ | ◯ | 0.07 |
| Example 6 | $4 \times 10^9$ | ◯ | 0.08 |
| Example 7 | $6 \times 10^6$ | ◯ | 0.06 |
| Example 8 | $1 \times 10^7$ | ◯ | 0.07 |
| Example 9 | $4 \times 10^6$ | ◯ | 0.08 |
| Example 10 | $9 \times 10^7$ | ◯ | 0.04 |
| Example 11 | $7 \times 10^7$ | ◯ | 0.06 |
| Example 12 | $7 \times 10^7$ | ◯ | 0.05 |
| Comparative Example 1 | OVER | △ | 0.05 |
| Comparative Example 2 | OVER | △ | 0.06 |

TABLE 1-continued

| | Surface Resistance (Ω/square) | Adhesiveness | Peeling Strength (N/25 mm) |
|---|---|---|---|
| Comparative Example 3 | OVER | Δ | 0.04 |
| Comparative Example 4 | $3 \times 10^9$ | X | 0.05 |
| Comparative Example 5 | $4 \times 10^9$ | X | 0.07 |
| Comparative Example 6 | $2 \times 10^9$ | X | 0.05 |
| Comparative Example 7 | OVER | Δ | 0.05 |
| Comparative Example 8 | OVER | Δ | 0.06 |
| Comparative Example 9 | OVER | Δ | 0.04 |

As described above, the coating films of Examples 1 to 12, as compared with the coating films of Comparative Examples 1 to 3, which contained no conductive polymer solution, had a low surface resistivity, a high adhesiveness and a similar peeling strength. Further, the coating films of Examples 1 to 12, as compared with the coating films of Comparative Examples 4 to 9, which were fabricated by using an epoxy compound containing no vinyl group, had a low surface resistivity, a high adhesiveness and a similar peeling strength, particularly an excellent adhesiveness.

INDUSTRIAL APPLICABILITY

The present invention can effectively be utilized, for example, for separate papers, antistatic films, conductive coating materials, touch screens, organic ELs, and conductive polymer fibers.

The invention claimed is:

1. An addition-curable antistatic organopolysiloxane composition, comprising:
    (a) a π-conjugated conductive polymer;
    (b) a polyanion;
    (c) a compound represented by the following chemical formula (1); and
    (d) an addition-curable organopolysiloxane composition,

[Formula 1]

(1)

wherein R is a linear unsaturated hydrocarbon group having 3 to 21 carbon atoms.

2. The addition-curable antistatic organopolysiloxane composition of claim 1, wherein (c) the compound represented by the chemical formula (1) is a compound represented by the following chemical formula (2):

[Formula 2]

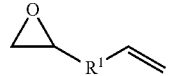

(2)

wherein R1 is a linear saturated hydrocarbon group having 1 to 19 carbon atoms.

3. The addition-curable antistatic organopolysiloxane composition of claim 1, comprising a reaction product of (b) the polyanion with (c) the compound represented by the chemical formula (1).

4. The addition-curable antistatic organopolysiloxane composition of claim 1, wherein (a) the π-conjugated conductive polymer has one or more repeating units selected from the group consisting of polypyrroles, polythiophenes, polyacetylenes, polyphenylenes, polyphenylene vinylenes, polyanilines, polyacenes, polythiophene vinylenes and copolymers of two or more thereof.

5. The addition-curable antistatic organopolysiloxane composition of claim 4, wherein (a) the i-conjugated conductive polymer is a poly(3,4-ethylenedioxythiophene) or a polypyrrole.

6. The addition-curable antistatic organopolysiloxane composition of claim 1, wherein (b) the polyanion comprises one or more anionic groups selected from a sulfonic acid group, a phosphoric acid group and a carboxy group.

7. The addition-curable antistatic organopolysiloxane composition of claim 1, wherein (b) the polyanion comprises, as copolymerization constituents, a polystyrenesulfonic acid, a polyvinylsulfonic acid, a polyacrylic alkylenesulfonic acid, a poly(2-acrylamide-2-methyl-1-propanesulfonic acid), or one or more thereof.

8. The addition-curable antistatic organopolysiloxane composition of claim 1, further comprising an organic solvent.

9. The addition-curable antistatic organopolysiloxane composition of claim 1, wherein the compound represented by the chemical formula (1) is 1,2-epoxy-5-hexene or 1,2-epoxy-9-decene.

10. An antistatic silicone film, wherein the antistatic silicone film is formed by supplying and curing the addition-curable antistatic organopolysiloxane composition of claim 1, on a substrate.

* * * * *